No. 746,417. PATENTED DEC. 8, 1903.
E. VEDOVELLI.
APPARATUS FOR USE IN ELECTRIC TRACTION ON THE CONDUIT SYSTEM.
APPLICATION FILED APR. 7, 1899.
NO MODEL.
9 SHEETS—SHEET 1.
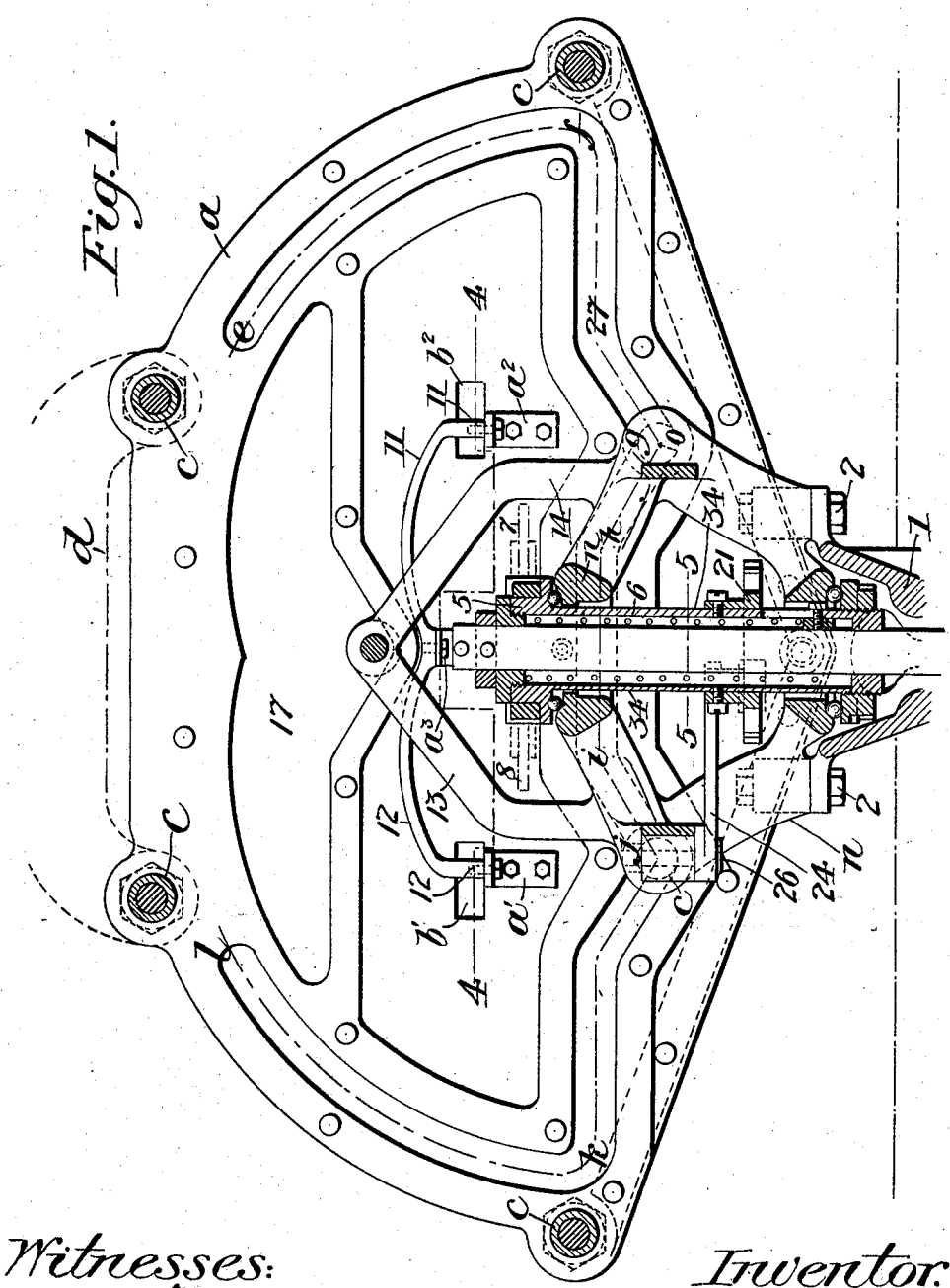
Witnesses:
Henry J. Suhrbier
Jacob H. Glaser
Inventor.
Edouard Vedovelli,
By Goepel & Niles,
his Attorneys.

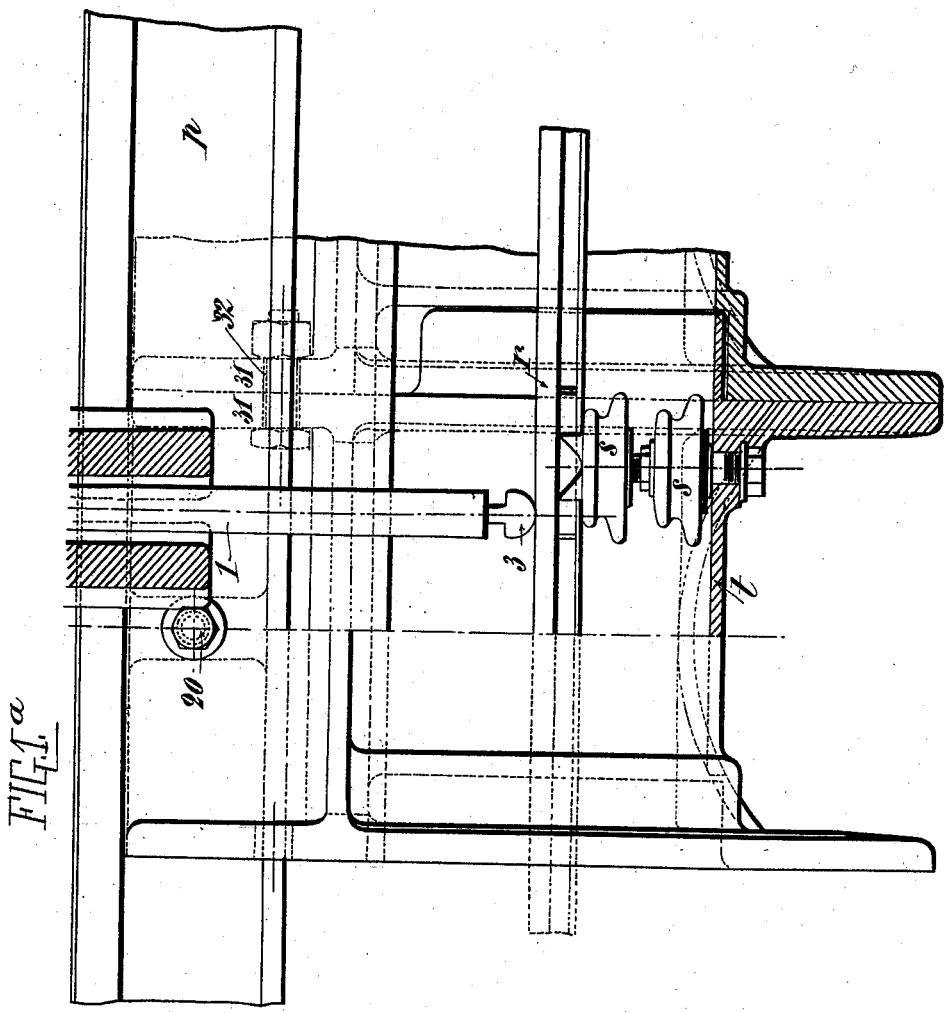

No. 746,417. PATENTED DEC. 8, 1903.
E. VEDOVELLI.
APPARATUS FOR USE IN ELECTRIC TRACTION ON THE CONDUIT SYSTEM.
APPLICATION FILED APR. 7, 1899.
NO MODEL. 9 SHEETS—SHEET 3.
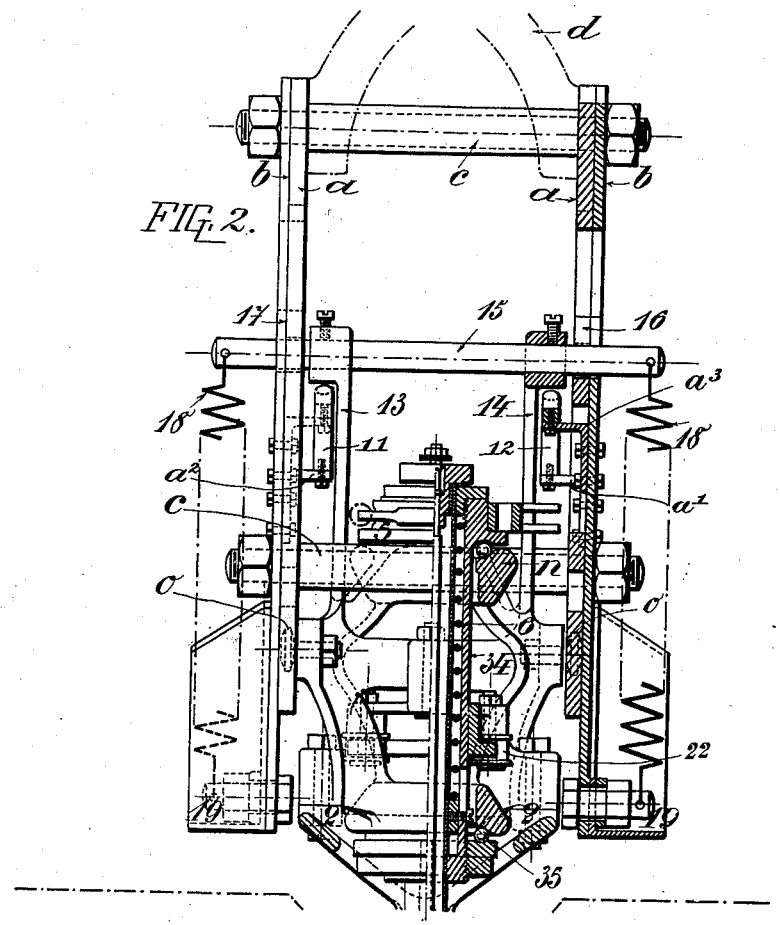

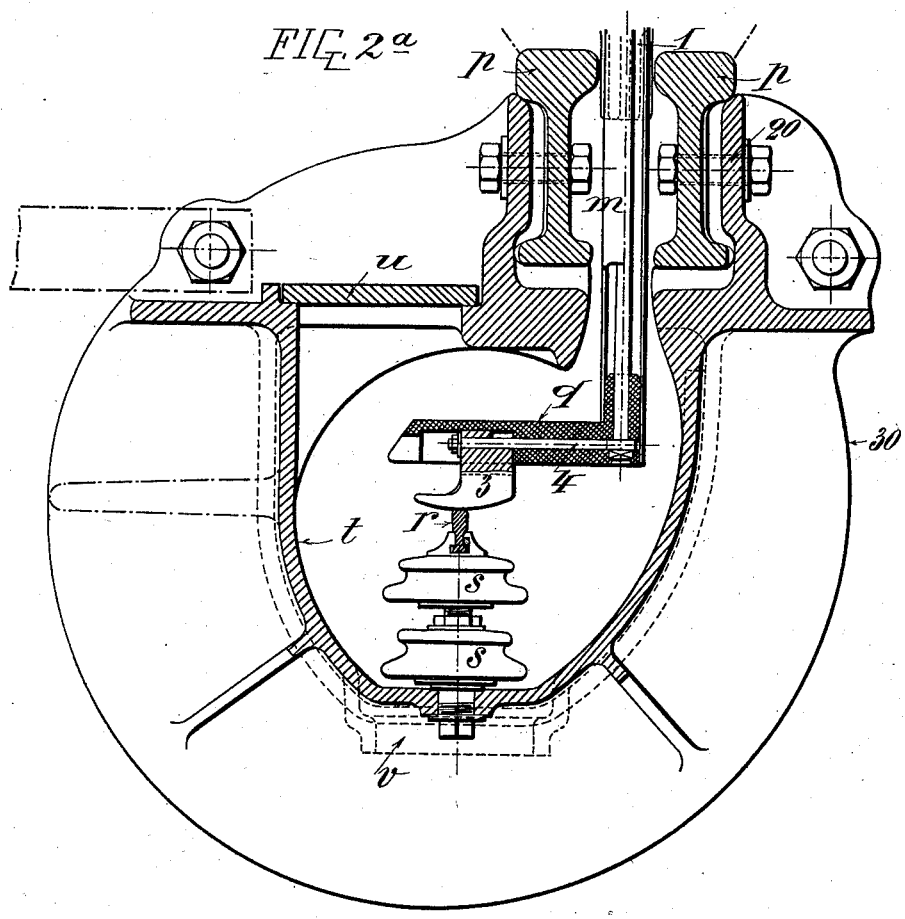

No. 746,417. PATENTED DEC. 8, 1903.
E. VEDOVELLI.
APPARATUS FOR USE IN ELECTRIC TRACTION ON THE CONDUIT SYSTEM.
APPLICATION FILED APR. 7, 1899.
NO MODEL. 9 SHEETS—SHEET 5.
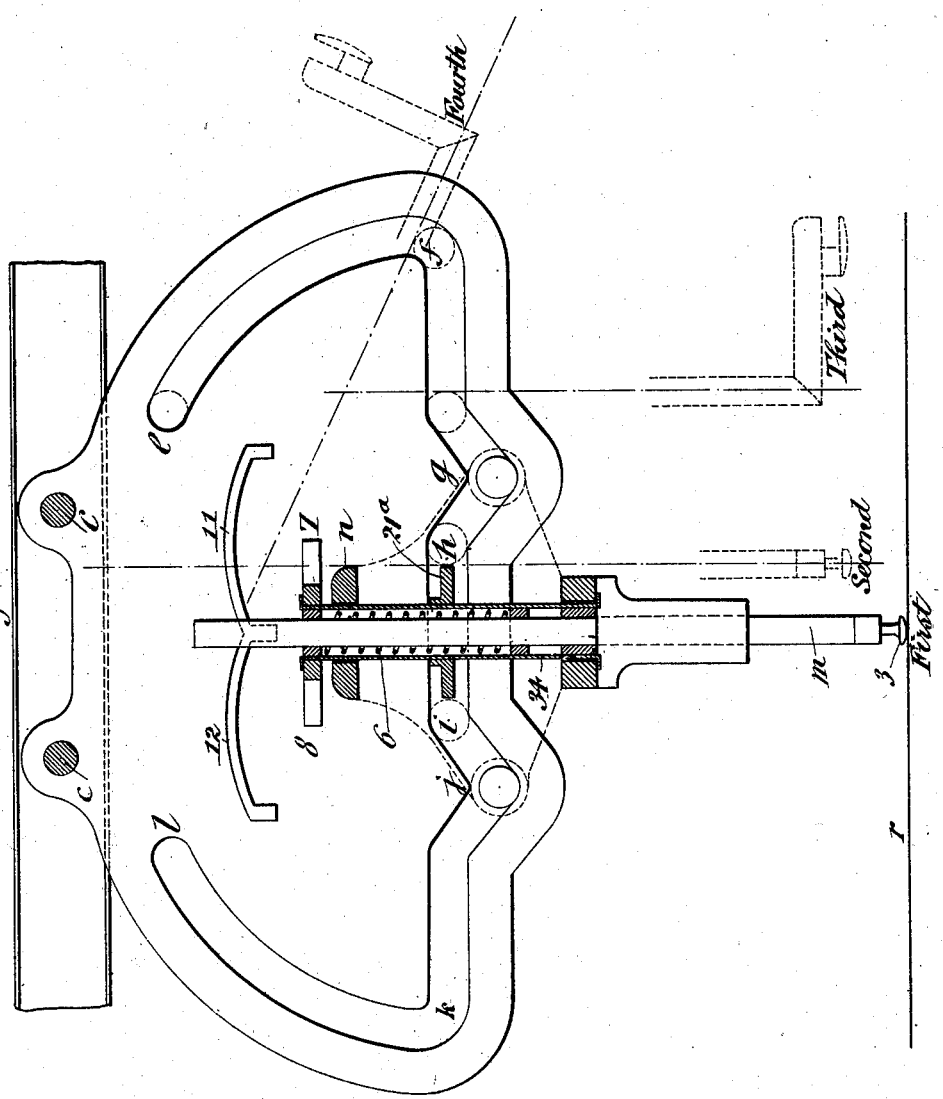

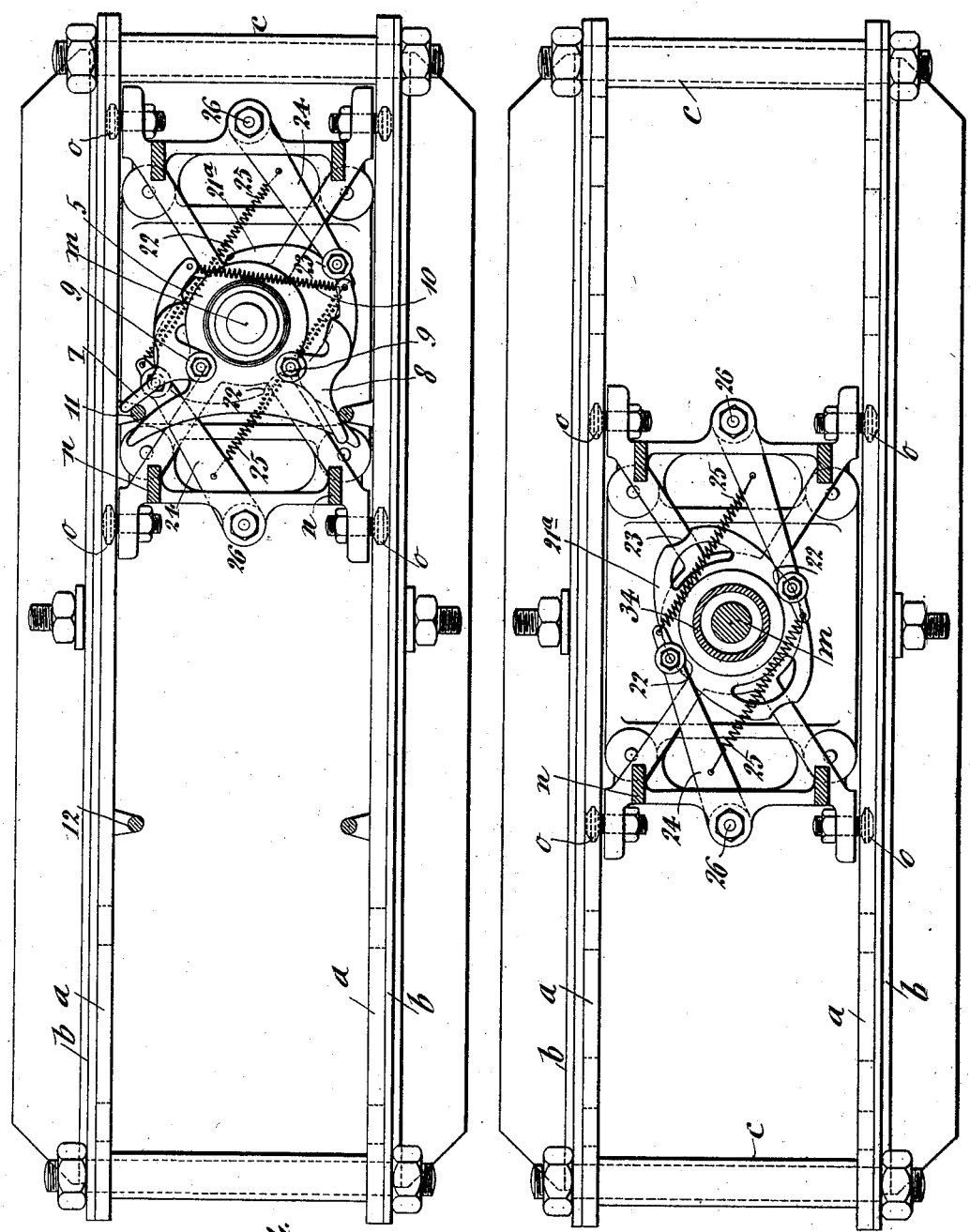

No. 746,417. PATENTED DEC. 8, 1903.
E. VEDOVELLI.
APPARATUS FOR USE IN ELECTRIC TRACTION ON THE CONDUIT SYSTEM.
APPLICATION FILED APR. 7, 1899.
NO MODEL. 9 SHEETS—SHEET 7.
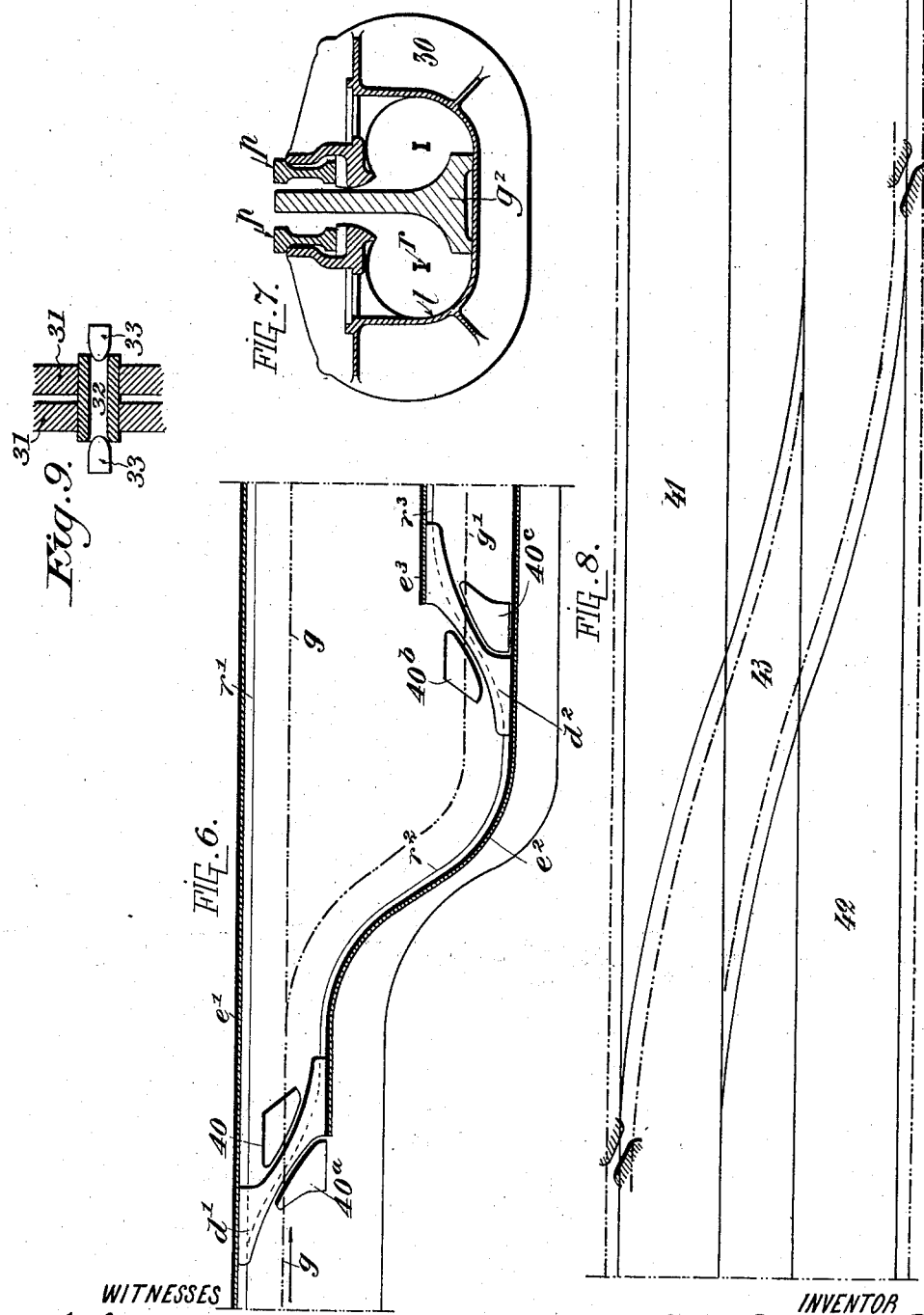

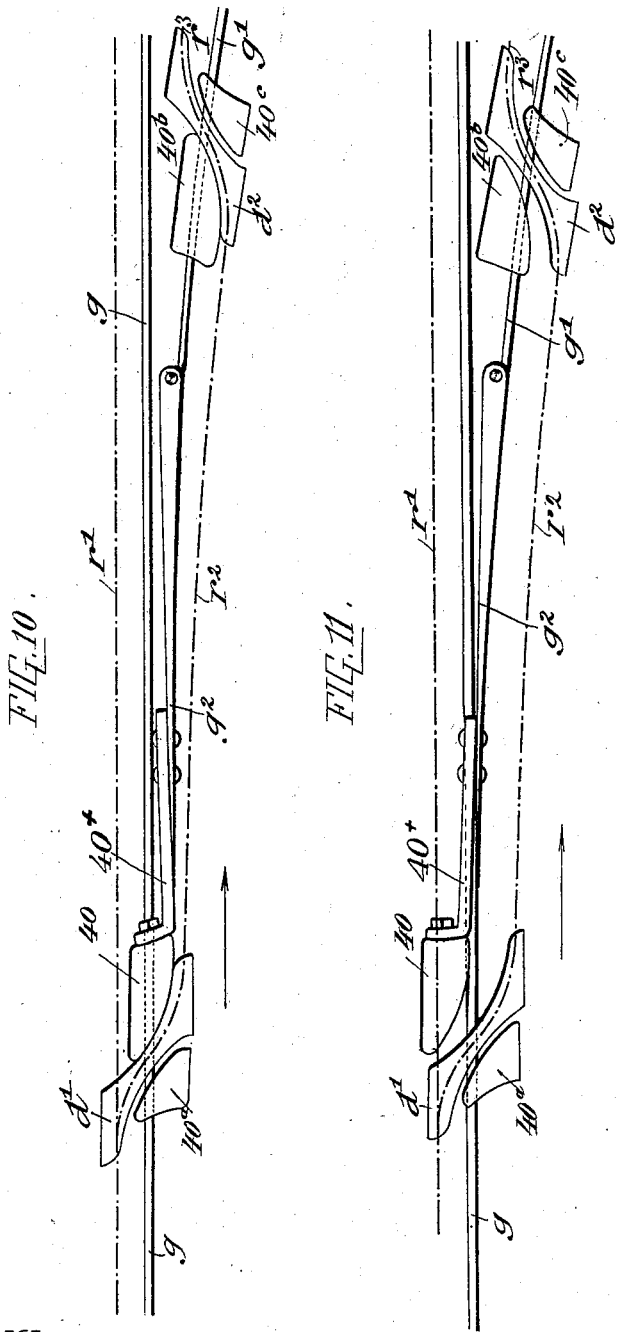

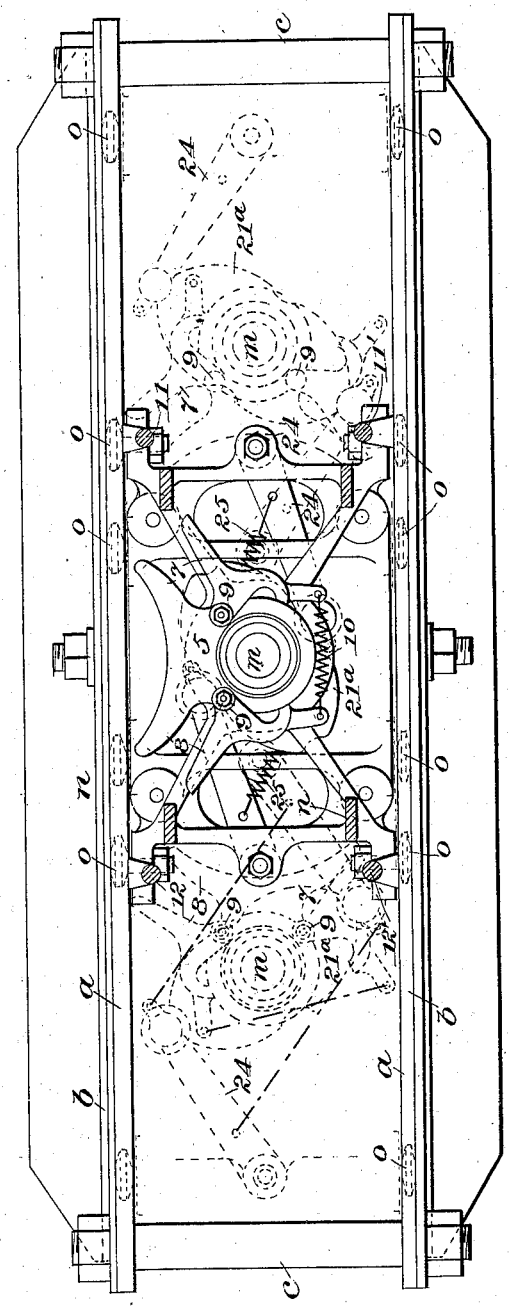

No. 746,417. Patented December 8, 1903.

UNITED STATES PATENT OFFICE.

EDOUARD VEDOVELLI, OF PARIS, FRANCE, ASSIGNOR TO LA SOCIÉTÉ VEDOVELLI ET PRIESTLEY, OF PARIS, FRANCE.

APPARATUS FOR USE IN ELECTRIC TRACTION ON THE CONDUIT SYSTEM.

SPECIFICATION forming part of Letters Patent No. 746,417, dated December 8, 1903.

Application filed April 7, 1899. Serial No. 712,063. (No model.)

*To all whom it may concern:*

Be it known that I, EDOUARD VEDOVELLI, a citizen of the Republic of France, and a resident of Paris, in the Republic of France, have invented a new and useful Improvement in or Relating to Apparatus for Use in Electric Traction on the Conduit System, which is fully set forth in the following specification.

Motors of electrically-propelled rail-vehicles are generally provided with power from a metallic conductor running parallel with the track, the return-current passing along the rails.

In the system to which the present invention is applied the conductor is contained in a passage or conduit underneath one of the rails.

This invention relates particularly to an improved device for receiving, protecting, and covering the conductor, to the special construction or arrangement of the device underneath the vehicle which is in continuous frictional contact with the conductor, and to means whereby the return-current passes along the track.

Some of the drawbacks of similar systems known as the "open" or "slotted" conduit systems are as follows:

First. In order to cover or hide the conductor, the conduit has necessarily a larger section than the slot through which the current-transmitter passes, which causes great difficulties as to placing of the switches, which must therefore be of very delicate construction. As will be seen later on, the switch devices according to this invention are as compact and easily mounted as are any of those of ordinary construction.

Second. To transmit the current from the conductor, a rigid device is used, passing through the slot. Now it is possible that by some accident the slot may be obstructed, and owing to the velocity of movement of the vehicle a shock will result, which may damage the transmitter and even the conduit itself. As will be seen, the transmitter according to this present invention will automatically and readily leave the slot whenever the latter is obstructed.

In order to render the following explanations clear, the improvements in apparatus for use in electric traction by means of a continuous subterranean conductor are illustrated, by way of example, in the accompanying drawings, in which—

Figures 1 and 1ª represent together a longitudinal section of the apparatus attached to the vehicle and carrying the depending rod, which at its lower end is provided with a shoe or plate, Fig. 1 showing the upper portion and Fig. 1ª the lower portion of the apparatus. Figs. 2 and 2ª show together a vertical transverse section of the apparatus, Fig. 2 showing the upper portion partly in elevation and Fig. 2ª the lower portion of the apparatus corresponding, respectively, with Figs. 1 and 1ª. Fig. 3 is a view showing parts of Figs. 1 and 1ª on a reduced scale, the contact-shoe being indicated in dotted lines in its different positions. Fig. 4 is a plan view, partly in section, on the line 4 4 of Fig. 1, the apparatus being shifted. Fig. 5 is a somewhat similar view showing the apparatus in middle position, the central portion of the section being taken somewhat lower down on line 5 5, Fig. 1. Fig. 6 is a diagram to facilitate the explanations referring to the arrangement of the switch. Fig. 7 represents a cross-section of the switch device. Fig. 8 shows, diagrammatically, a junction of two parallel lines arranged according to this invention. Fig. 9 is a detail view. Figs. 10 and 11 are diagrams illustrating the positions of the switch-blocks, respectively, when the switch is open and when closed; and Fig. 12 is a plan view, partly in horizontal section, through the upper part of the mechanism.

Similar characters of reference indicate corresponding parts.

In Figs. 1ª and 2ª, $p\ p$ indicate two rails having a slot between them sufficiently wide to allow for the passage of a rod $m$, provided at its lower end with an arm $q$, provided with a shoe 3, adapted to slide along the electric conductor $r$. The conduit itself is constructed of a series of metal tubes—say cast-iron—which fit at their ends into each other without causing any break in the continuity of the tube so formed. These tubes are preferably strengthened at intervals by strong ribs 30, calculated to resist any pressure that might be produced between the two rails forming the slot and the vertical pressure produced by the rolling-stock and other causes. The upper part between two ribs is closed by means of metallic covers u, by means of which access may be had to the conduit. The conduit is also provided on its lower surface at convenient distances apart with holes v, by which any water that might enter the conduit may be drained away.

The tubes forming the conduit are flanged at both ends, so that the adjacent flanges butt against each other and are united by screw-bolts. The slot-irons p are firmly held to the cheeks of the conduit-cases by screw-bolts 20.

The current preferably returns by the rails, for which purpose they are so connected as to form a safe conducting medium; but in order to make use of the great conductibility offered by the strong section of the conduit the different sections of the conduit are so united as to form a reliable conductor for this purpose.

The two adjacent flanges 31 31 of two adjoining tubes are provided with holes of equal diameter facing each other. A hollow tube or sleeve 32, of copper, of a length slightly exceeding the thickness of the two flanges 31 is passed through these holes and the ends enlarged by driving in conical wedges 33 33, Fig. 9, of a slightly-greater diameter than that of the copper tube, by which means the copper is forced into intimate contact with the cast-iron and the two sections are reliably united for the purpose of allowing the return-current to pass.

In the body of the vehicle is secured a kind of box formed, principally as shown in Figs. 1, 2, 3, 4, and 5, by two cheeks $a$ $a$, inclosed by two plates $b$ $b$. These cheeks are connected by means of screw-bolts or ties $c$, the upper ones also serving to fasten a cover $d$ or any other device for securing the whole to the vehicle. Between these cheeks is arranged a carriage $n$ on four rollers $o$, placed at the corners of a rectangle. These rollers guide the carriage along the way formed by the grooves $e f g h i j k l$, with which the two cheeks are provided, two of the rollers moving in the grooves of one cheek and the other two in that of the other cheek. The center of the carriage is provided with a socket 34, revoluble freely around its axis, which socket is perpendicular to the plane containing the axes of the four rollers and through which passes a rod $m$, the details and working of which will be hereinafter explained, and which carries at its lower end the contact-shoe. The grooves $e$ to $l$ being of a certain form, it follows that the carriage when moving follows a certain and always the same path. Suppose the carriage, placed as shown in Fig. 1 in the center, is moved between the two cheeks toward the left, the rollers $o$ $o$ following the parallel grooves in which they run, and these grooves being inclined the carriage will rise. If the movement toward the left is continued, the rollers will enter two horizontal and parallel tracks. Hence the carriage moves in a horizontal direction. If the movement of the carriage toward the left is continued, one of the rollers $o$ will enter the portion $k l$ of the groove, which forms part of a circle described from the axis of the other roller as a center. The second roller then remains stationary, while the first passes upward through a quarter of a circle, the carriage then moving round this one of its rollers. In consequence of the movement of the central rod $m$, which carries the contact-shoe between the rails $p p$, it would be worn out very quickly. To avoid this and to avoid having to replace the rod wholly through being so worn out, a sheath 1 is provided around the rod between the rails, which sheath is secured by screws 2 to the inner part of the carriage inclosed by the cheeks $a$. The horizontal arm $q$ of the contact device carries the shoe 3, which is in contact with the conductor $r$. This shoe is insulated from the outer parts $q$ and $m$ of the contact device or current-transmitter, in the interior of which, however, is contained the conductor 4, which takes the current to the top of the hollow vertical rod $m$, from whence it passes to the motor in the vehicle. The vertical rod $m$ slides vertically in the socket 34, but participates in the rotatory movement of the latter by means of a screw or pin 35, engaging in a vertical groove therein. A spring 6 has a constant tendency to press the shoe 3 against the rail $r$ in the conduit. This arrangement gives to the whole device an amount of elasticity which allows the vertical rod $m$ to rise slightly and follow any irregularities of the surface of the conductor-rail $r$. The socket 34 is provided at its upper end with a shoulder piece or plate 5, by which it is connected to the carriage $n$. This shoulder piece or plate 5 has thereon two forks 7 and 8, placed at an angle of ninety degrees from each other. Each fork is composed of two arms, of which one is stationary, (being formed integral with the plate 5,) the other pivoted at a point 9 to said plate. The movable arms are actuated by spring 10, which constantly tends to turn them away from the fixed arms. Against the cheeks $a$ are secured in the direction of the forks 7 and 8 abutments 11 and 12, the object of which will be hereinafter explained.

The frame constituting the carriage $n$ is completed at the upper part by two standards or brackets 13 and 14, to which is secured a cross-bar 15, passing through openings 16 and 17 in the cheeks $a$ $b$ on either side. At the ends of the cross-bar 15 springs 18 are attached, while the other ends of said springs are fastened at points 19 to the lower parts of the frame. On the central vertical socket 34 is also secured at 21 an elliptical cam $21^a$, provided with four notches or recesses 22 22 23 23 at the ends, respectively, of two diameters at right angles to each other. To this cam are applied the ends of two arms 24 and 24 by springs 25 25, which arms are pivoted at points 26 on the frame of the carriage.

Now supposing the apparatus is in the position shown in Figs. 1 to 3 and 5 and that the vehicle is moving, if any obstacle—such as, for instance, one of the screw-bolts 20, fixing the rails to the conduit—should come in the way of the rod $m$ or of its sleeve $l$ the carriage $n\ o$ will be brought to a standstill, while the cheeks, being fixed parts of the vehicle, will still move forward with the vehicle. In consequence of this movement of the cheeks the carriage $n\ o$ will begin to move with two of its rollers upward along their groove $j$, while its other rollers move upward along the corresponding groove $g$—that is, the whole of the current-transmitter $m$ will be raised—and hence the shoe 3 will be raised out of contact with the conductor into its second position, as indicated by dotted lines adjacent the word "Second" in Fig. 3.

In consequence of the movement of the cheeks relatively to the carriage stopped by the obstacle two of the rollers $o$ arrive at $h$ from $i$, where they were a moment before, thus coming to the end of the horizontal section of the groove, while the other two rollers $o$ arrive in a similar manner at $f$.

In the normal position of the plate 5 and forks 7 and 8 the two projecting horns of plate 5 lie adjacent to the side of the frame which is uppermost in Fig. 4. If then the carriage be shifted to the right, the one horn of said plate engages with the stop or abutment 11, while the movable member 7 passes to the other side thereof. The abutment causing this portion of the plate to remain stationary effects the rotation of the shaft 34 through an arc of ninety degrees. This shifting of the plate through a quarter of a revolution brings the other horn of the plate, together with the hook 8, against a second stop 11' on the other side of the frame. This prevents any further revolution of the plate. In this position the movable member 8 performs no function, but simply yields sufficiently to permit the horn of the plate to rest against the abutment 11'. If, however, the carriage should move from its normal position toward the left of the frame, the other horn of the plate (that adjacent the lower part of the frame as it appears in Fig. 4) engages the stop or abutment, which in this figure is marked 12. This checks the movement of this horn, causes the horn 8 to engage with the other side thereof, and will effect the rotation of the shaft 34 through a quarter of a revolution, just as in this figure, but in the opposite direction, thus bringing the other horn of the plate into engagement with the stop or abutment 12', which is shown on the left-hand side of the lower frame.

The position of the parts when in normal or middle position is shown in Fig. 12 in full lines, and the positions of the same when moved to the right and when moved to the left are indicated in said figure in dotted lines. This partial rotation of the socket 34 and of the central conducting-rod $m$ with it, since it is fixed to it, will result in turning the horizontal arm $g$, in which the lower end of the vertical rod $m$ terminates, into its third position at right angles to its former position, as indicated in dotted lines adjacent the word "Third" in Fig. 3—i. e., it will turn it parallel to the direction of the slot between the two track-rails $p\ p$. During this time the fixed arm of the fork 7 is in engagement with the lower portion of the abutment 11. To provide for the swinging of the arm, a small opening $b^2$ is provided in the outer casing-wall $b$. By the time the carriage has reached the end of its horizontal movement, however, the fixed arm of the fork 7 has completed that part of its rotation which causes it to project slightly through or into the opening and is again completely at the interior of the casing. Further movement of the cheeks relatively to the carriage causes the front rollers to describe part of a circle $f\ e$ around the other rollers as centers. During this movement the fork 7 rises with the movement of the carriage and continues in engagement with the curved abutment 11, thereby retaining the arm 3 and its shoe $q$ in position at right angles to the former position of the same when in the conduit. By thus revolving round these rollers as centers, which forms the third phase in the movement of the carriage, the carriage will be moved into an inclined fourth position, as indicated by the dotted lines adjacent the word "Fourth" in Fig. 3, in which it is kept by the springs 18 as long as the car-conductor does not move it back by hand. In this position the shoe 3 will have been raised out of the conduit from between the slot-rails. The carriage then will return to the point it started from by the way it came, and the fork 7 or 8, which had produced the rotation of the socket 34 by means of striking against the abutment 11 with its fixed arm, will now produce the inverse movement by means of its movable arm, thereby returning the horizontal shoe-carrying arm $q$ to the position it first occupied, as illustrated in Figs. 2ª and 3, and so bring it above the underground conductor. By the further descent of the carriage down the groove $j$ the shoe 3 will be forced onto the underground conductor, with which a good contact is thus reëstablished.

According to the preceding description it is easy to understand that the apparatus will satisfactorily work in whatever direction the vehicle may be driven, since the apparatus is arranged absolutely symmetrically as regards its median plane.

All that has been stated as regards the right-hand side of Figs. 1 and 3 is applicable to the left-hand side of the same figures if the movement is reversed, and it is also clear that the identical effects would be repeated were the horizontal rod $q$ on the other side. The abutments 11 and 12 are of corresponding shape, preferably connected, as shown, and supported by means of suitable end supports $a'$ $a^2$ and an intermediate support $a^3$, secured to the plate $b$. An opening $b'$, corresponding in position and purpose to the opening $b^2$, is provided in the plate $b$ for the forked arm 8.

In the preceding description it was explained that the cam 21 is provided with four notches. The two deepest notches 22 are calculated to secure in an exact manner the central rod $m$, and with it the horizontal arm $q$ at its lower end, in two positions at an angle of one hundred and eighty degrees. This horizontal arm $q$ is therefore forced by the peculiar shape of the cam to occupy a position perpendicular to the plane of the cheeks on one side or on the other. It has also been seen that during the horizontal movement of the carriage the horizontal arm $q$ had been turned, by means of the forks 7 and 8 and the fixed abutment 11, into a position perpendicular to what it was before, and in this position it is securely held by the notches 23, engaging with the spring-arm. In short, whenever the carriage is moved relatively to the cheeks or, in other terms, whenever the cheeks are displaced relatively to the carriage the following movements are successively produced:

First. The carriage is lifted and the central vertical spring 6 no longer presses the device comprising the central vertical rod $m$, carrying the horizontal shoe-arm $q$ and the transmitter-shoe 3, upon the conductor-rod $r$.

Second. The carriage remains stationary; but the rod $m$ is rotated through an angle of ninety degrees and the shoe-arm $q$ is turned from a position at right angles to the slot to one in which it is parallel with it.

Third. The carriage will rotate about two of its rollers as a center and occupy an inclined position, while the contact device $m$, $q$, and 3 is raised out of the slot.

If now the carriage is removed the reverse way, the same operations will be produced, but reversed in their order—i. e.:

First. The carriage rotates about two of its rollers as centers until it takes up a horizontal position and the contact device reënters the slot, which is possible, since in this position the shoe-arm $q$ is parallel to the slot. The shoe-arm $q$ is retained in the proper position for entering the slot by engagement of the spring-arms 24 with the notches of the cam 21.

Second. The carriage recoils to a certain extent, and during that time the shoe-arm $q$ is turned so as to occupy a position at right angles to the position it occupied before, so that the shoe comes into position above the conductor.

Third. The carriage still recoils, but now descends, and the contact device, composed of the vertical and horizontal rods $m$ and $q$ and the shoe 3, is pressed against the conductor by means of the central vertical spring 6.

As has been explained, the horizontal shoe-arm $q$ may be turned in every direction—that is to say, in either the forward and backward movement of the vehicle, or in either of these movements it may turn to the right or left of the direction of the movement.

It is necessary that during the return movement of the carriage the action of the abutments 11 or 12 should be such as to bring back the horizontal arm $q$ to the position which it previously occupied and to no other. This object is obtained by the movable arms of the forks 7 and 8. To the above-described movement the fixed arm of the fork 7 struck against the abutment 11, the movable arm passing behind it, which arrangement produces the reverse movement of the return of the carriage.

As regards the fork 8, it is the movable arm which in the rotatory movement comes first against the abutment 11', which is on the other cheek symmetrically placed to abutment 11, which instead of passing behind the abutment comes into position, owing to its movability, by the side of the fixed arm. The fork 8 has therefore no influence on the abutment during the return movement of the carriage.

The mechanism described above serves, therefore, to readily insert in or withdraw from the conduit the current-transmitter, whether it be required by the exigencies of the service or by an accidental obstruction in the slot; but a part of the above mechanism also serves for working the switches, as will be seen from the following description.

As has been stated above, one of the drawbacks attendant upon the system of electric traction by means of continuous underground conduits consists in the fact that the switching device in consequence of the presence of the conduit is necessarily almost wholly overhanging, and from the point of view of construction this is a weak part, which wears out rapidly and may result in serious consequences.

Owing to the rotation described above, which the arm carrying the contact-shoe is enabled to perform, hanging points can be dispensed with altogether, and they may rest at the bottom of the conduit. Such a switch device then presents an obstacle in the way of the horizontal arm $q$ and of the conductor $r$ in one direction. To insure a continuity in the conductor $r$, it passes where the switch-tongue is placed to the other side of the slot, and by means of a suitable abutment or projections the horizontal arm $q$ is caused to turn through an angle slightly exceeding ninety degrees, whereupon the cam 22 will force it to complete the semicircular movement. When the deviation of the two lines of rails has become sufficiently large to permit of the conduit being again on the usual side, an abutment operating like the one just referred to forces the horizontal arm $q$ back again into its first position.

Referring to Figs. 10 and 11, $g$ indicates the track-rail of the main line, and $g'$ that of the branch. $g^2$ is the track switch-tongue arranged to connect the same, and which may be supported on the bottom of the conduit. As shown in Fig. 7, $r'$ is the conductor of the main line, $r^2$ that of the switch, and $r^3$ that of the branch line. $d'$ is a stationary contact-piece arranged at the same level with the conductors $r'$ $r^2$ and connecting the same, and $d^2$ is a similarly-arranged contact-piece connecting the conductors $r^2$ $r^3$. Adjacent the contact-piece $d'$ are arranged two switch-blocks 40 40$^a$, one at each side of the contact-piece. Similar blocks 40$^b$ 40$^c$ are arranged one at each side of the contact-piece $d^2$. The blocks 40 and 40$^b$ are supported in any suitable manner at the same height as the shoe 3 and are movable laterally into and out of the path of the same. They are preferably connected by any suitable means with the switch-tongue $g^2$, so as to be operated therewith. The blocks 40$^a$ and 40$^c$ are stationary.

When the switch is open, as in Fig. 10, the shoe of a car moving in direction of the arrow passes at the outer side of block 40, its arm $q$ passing over said block and no switching operation of the shoe taking place, the car continuing along $g$ and the shoe along $r'$. The effect is the same when the car passes in opposite direction along the main line over the open switch. When the switch is closed, as in Fig. 11, however, a car moving in direction of the arrow is switched by tongue $g^2$ from the main line. The block 40 being in the path of the shoe, the latter strikes the same and is deflected—i. e., caused with its arm to turn about the vertical axis of the arm to an extent slightly exceeding ninety degrees and then by its actuating mechanism to a point one hundred and eighty degrees, or a half-revolution, from its original position. During this turning the shoe is in contact with contact-piece $d'$, so that the current is not interrupted. From the contact-piece it passes upon the switch-conductor $r^2$ and follows the same during the passage of the car over the switch. The shoe 3 then strikes the block 40$^c$ and is turned, as before described, but in opposite direction, back through a half-revolution, during which it remains in contact with contact-piece $d^2$, from which it passes upon the branch-line conductor $r^3$. When a car moves from the branch line over the switch upon the main line, the switch being as in Fig. 11, block 40$^b$ effects the turning of the shoe and its arm, the shoe passing thus over $d^2$ and $r^2$, and the block 40$^a$ returns the shoe and arm to former position, the shoe being during the return in contact with $d'$.

Fig. 6 shows the construction of the conduit at the switch, the contact-pieces and blocks being arranged at the entrance to the switch and the entrance to the branch, respectively. $e'$ $e^2$ $e^3$ indicate the conduit-walls.

The block 40$^b$ may be a fixed abutment, provided it is fixed in the position represented in Fig. 11, so as to act (in the same manner as the abutment 40) on the horizontal arm $q$ of the car, the current for which must pass from the conductor $r^3$ to the conductor $r'$ by the intermediate conductor $r^2$.

As a means of connection between the switch $g^2$ and the movable abutment 40 there may be provided an arm 40$^x$, Figs. 10 and 11, extending beneath the rail and directly connecting the switch and abutment, so that the same always move together.

By the two movements described either the possibility of obtaining a strong switch or being able to withdraw without difficulty the contact-shoe from the slot the difficulties of switching are overcome, and, further, it is possible to switch from one line to another on a line having two tracks.

In Fig. 8 the slot is, for instance, shown as on the outside of the track or under the outer rail. It would therefore be necessary to provide the vehicle with two transmitters if the vehicle is expected to pass from one track to another—say from the track 41 onto the track 42.

The switch track or connection 43 is provided with two conduits—one on the right, the other on the left—to correspond, respectively, with the conduits 41 and 42 of the two tracks.

To pass from track 41 onto the track 42, the vehicle has to pass to the switch-track 43 by means of an ordinary switch, the conduit being in both tracks to the left. The conductor or driver of the car by means of any suitable bar provided for the purpose reaches beneath the car, places the bar upon the arm 1, the transmitter being in the position indicated at 4 in Fig. 3, and by pressing downwardly with said bar causes the right-hand transmitter to drop, as before described, and it enters the slot and automatically places itself on the conductor. Thus the left transmitter coming to the end of its slot meets with it as an obstacle, which has the effect of automatically lifting it out of the conduit in the manner previously described.

Having now particularly described and ascertained the nature of my said invention and in what manner the same is to be performed, I declare that what I claim is—

1. In apparatus for use in electric traction on the conduit system a vertical rod depending from the vehicle and adapted to pass through a slot formed preferably between two bars forming one of the track-rails, said rod carrying at its lower end a horizontal arm provided with a contact-shoe the arm and rod so connected being capable of revolving as one piece, about a vertical axis so as either to turn through an angle of ninety degrees from the first position, for the purpose of being lifted out of the conduit and slot; or through an angle of one hundred and eighty degrees from the first position in order to come in contact with another conductor not forming a continuation of the first, substantially as described.

2. In combination with the vertical rod of the contact device a movable carriage carried by the vehicle adapted to rise, or be inclined, in which movements the vertical rod and the contact-shoe participate, the vertical rod being mounted on said carriage in such a manner that it can turn relatively to the carriage, whereby the contact-shoe is enabled to make a quarter or half rotation substantially as described.

3. The combination with the vertical rod carrying the horizontal contact-shoe arm of a cam provided with four notches, at intervals of ninety degrees for regulating the rotatory movement of said contact-shoe arm said cam being acted upon by rollers acting as stops, and which are kept applied to the cam, by springs substantially as described.

4. The combination with the vertical rod supporting the horizontal contact-shoe arm of two forks arranged at the upper part of said rod, each of which consists of a fixed arm and a movable arm the said forks being adapted to strike against abutments when the carriage moves relatively to the vehicle for the purpose of imparting to the vertical bar the required movement of rotation substantially as described.

5. The combination with a carriage supporting the vertical rod of springs so arranged that the carriage when it has been turned up horizontally after the contact device leaves the slot is kept in this position, until returned by hand to its former position substantially as described.

6. A conduit formed of a number of flanged tubes fitting into each other, said tubes being connected together electrically by means of copper tubes passing through and firmly fitting holes in the flanges of adjacent tubes in order to provide a continuous and efficient path for the return current; the conduit being provided preferably at intervals with holes for the purpose of drawing away any water which may enter it, and with removable parts for permitting access to the interior of the conduit substantially as described.

7. The combination, with a conduit, of a feed-rail in the same at one side thereof, a collector supported above and extending into said conduit, and composed of a vertical rotary rod, an arm extending laterally therefrom and a shoe carried by said arm and adapted to engage said rail, a contact-piece in the conduit connected with said feed-rail, a switch feed-rail connected with the other end of the contact-piece, a fixed abutment at one side of said contact-piece, a movable abutment at the other side of said contact-piece, a second contact-piece at the opposite end of the switch-rail, a fixed abutment at one side of said contact-piece, a movable abutment at the opposite side of the same, and a branch feed-rail extending from said second contact-piece, substantially as set forth.

In testimony whereof I have signed this specification in the presence of two subscribing witnesses.

EDOUARD VEDOVELLI.

Witnesses:
EMILE LIVUE,
EDWARD P. MACLEAN.